(12) United States Patent
Ro et al.

(10) Patent No.: US 7,293,226 B2
(45) Date of Patent: Nov. 6, 2007

(54) METHOD AND APPARATUS FOR ADAPTIVELY PERFORMING DEFECT SCAN ACCORDING TO CHANNEL CHARACTERISTICS

(75) Inventors: Choong rae Ro, Gumi-si (KR); Chang-sik Kwon, Gumi-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 419 days.

(21) Appl. No.: 10/704,704

(22) Filed: Nov. 12, 2003

(65) Prior Publication Data
US 2004/0153949 A1 Aug. 5, 2004

(30) Foreign Application Priority Data
Nov. 25, 2002 (KR) .................. 10-2002-0073478

(51) Int. Cl.
*H03M 13/00* (2006.01)
(52) U.S. Cl. .................. 714/799; 714/704; 714/724; 714/758
(58) Field of Classification Search ........... 714/704, 714/724, 758, 799
See application file for complete search history.

(56) References Cited

U.S. PATENT DOCUMENTS 5,781,699 A * 7/1998 Dittmar et al. ............ 706/13
6,754,030 B2 * 6/2004 Seng et al. ............... 360/76
6,871,304 B2 * 3/2005 Hadjihassan et al. ....... 714/704
6,877,116 B1 * 4/2005 Kost et al. ................. 714/704
6,898,033 B2 * 5/2005 Weinstein et al. ........... 360/31

FOREIGN PATENT DOCUMENTS

| JP | 10-172101 | 6/1998 |
| JP | 11-250409 | 9/1999 |

OTHER PUBLICATIONS

Japanese Office Action for corresponding Japanese Application No. 2003-393784 dated Dec. 12, 2006.

* cited by examiner

*Primary Examiner*—Guy Lamarre
*Assistant Examiner*—Esaw Abraham
(74) *Attorney, Agent, or Firm*—Staas & Halsey LLP (57) ABSTRACT

A method for performing a defect scan according to the characteristics of channels of a data storage system by determining design parameters based on the channel characteristics includes measuring characterization values related to the performance for channels of the data storage system; determining parameters for the respective channels based on the measured characterization values, the parameters for determining the data processing characteristics of the respective channel; and performing a defect scan on the data storage system using the determined parameters in a data processing process for the respective channels.

15 Claims, 5 Drawing Sheets

WAVEFORM OF DEFECT
IN HEAD/DISK WITH
BER 6.2 ORDER

FIG. 6

WAVEFORM OF DEFECT
IN HEAD/DISK WITH
BER 7.1 ORDER

METHOD AND APPARATUS FOR ADAPTIVELY PERFORMING DEFECT SCAN ACCORDING TO CHANNEL CHARACTERISTICS

CROSS-REFERENCE TO RELATED APPLICATION

This application claims the benefit of Korean Patent Application No. 2002-73478 filed on Nov. 25, 2002, in the Korean Intellectual Property Office, the disclosure of which is incorporated herein by reference.

BACKGROUND OF THE INVENTION

1. Field of the Invention

The present invention relates to a method and apparatus for controlling a data storage system, and more particularly, to a method of and apparatus for performing a defect scan on a data storage system by determining design parameters based on the system's channel characteristics.

2. Description of the Related Art

A hard disc drive is an auxiliary memory device for computers that writes or reads data with respect to a disc using a magnetic head. As the capacity and integration density of a hard disc drive increases and its size decreases, the bits per inch (BPI) and tracks per inch (TPI) of the hard disc increase. BPI and TPI represent the writing density in a disc rotation direction and track thickness per inch of a disc, respectively. Thus, it is required to more precisely and rapidly control the position of the head.

A conventional hard disc drive is generally manufactured to include at least one disc and at least one head. That is, a hard disc drive includes a multi-channel disc and a head.

A surface of a disc is coated with a magnetic material. If a magnetic layer is not evenly applied onto the surface of the disc or the inside of the hard disc drive is contaminated with dust during assembling of the hard disc drive, the disc may contain a defect. The defect prevents the disc from being appropriately magnetized, and therefore information cannot be written to the disc or data already written on the disc is erased.

Conventionally, when manufacturing a hard disc drive, the presence of defects on a disc is determined by performing a defect scan thereon and an area of the disc in which a defect occurs is slipped so that a user cannot use the area, thereby minimizing loss of information. In the conventional method, the defect scan is carried out using design parameters, such as the length of an error correction code (ECC) which are determined to be the same for all disc channels regardless of channel characteristics. However, most hard disc drives have multi-channels and the characteristics of the channels may be different from each other depending upon the state of a disc, the types of devices installed in a hard disc drive, and the state of the devices that are assembled together in the hard disc drive. Although design parameters are set to be the same irrespective of channel characteristics, it is still possible to obtain different results when performing a defect scan with respect to the same-sized defects in different channels, thereby decreasing the quality of a hard disc.

SUMMARY OF THE INVENTION

Accordingly, it is an aspect of the present invention to provide an adaptive defect scanning method and apparatus for determining channel characteristics and setting design parameters to match the channel characteristics before performing a defect scan on a disc, thereby providing a reliable defect scanning result according to the channel characteristics.

Additional aspects and/or advantages of the invention will be set forth in part in the description which follows and, in part, will be obvious from the description, or may be learned by practice of the invention.

The foregoing and/or other aspects of the present invention are achieved by providing a method of performing a defect scan on a data storage system according to channel characteristics, the method comprising measuring characterization values related to the performance of channels of the data storage system, determining parameters for each of the channels respectively based on the measured characterization values and performing a defect scan on the data storage system using the determined parameters in a data processing process for each of the channels.

It is another aspect of the present invention to provide an apparatus for controlling a data storage system, the apparatus comprising a memory device which stores a table that sets parameters corresponding to predetermined characterization values related to the performance of the data storage system; and a controller which measures predetermined characterization values related to the performances of a plurality of channels of the data storage system, reads parameters corresponding to measured characterization values for each of the channels from the table stored in the memory device, applies the parameters for each of the channels to a channel data processing procedure, and controls performing of a defect scan on the data storage system.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
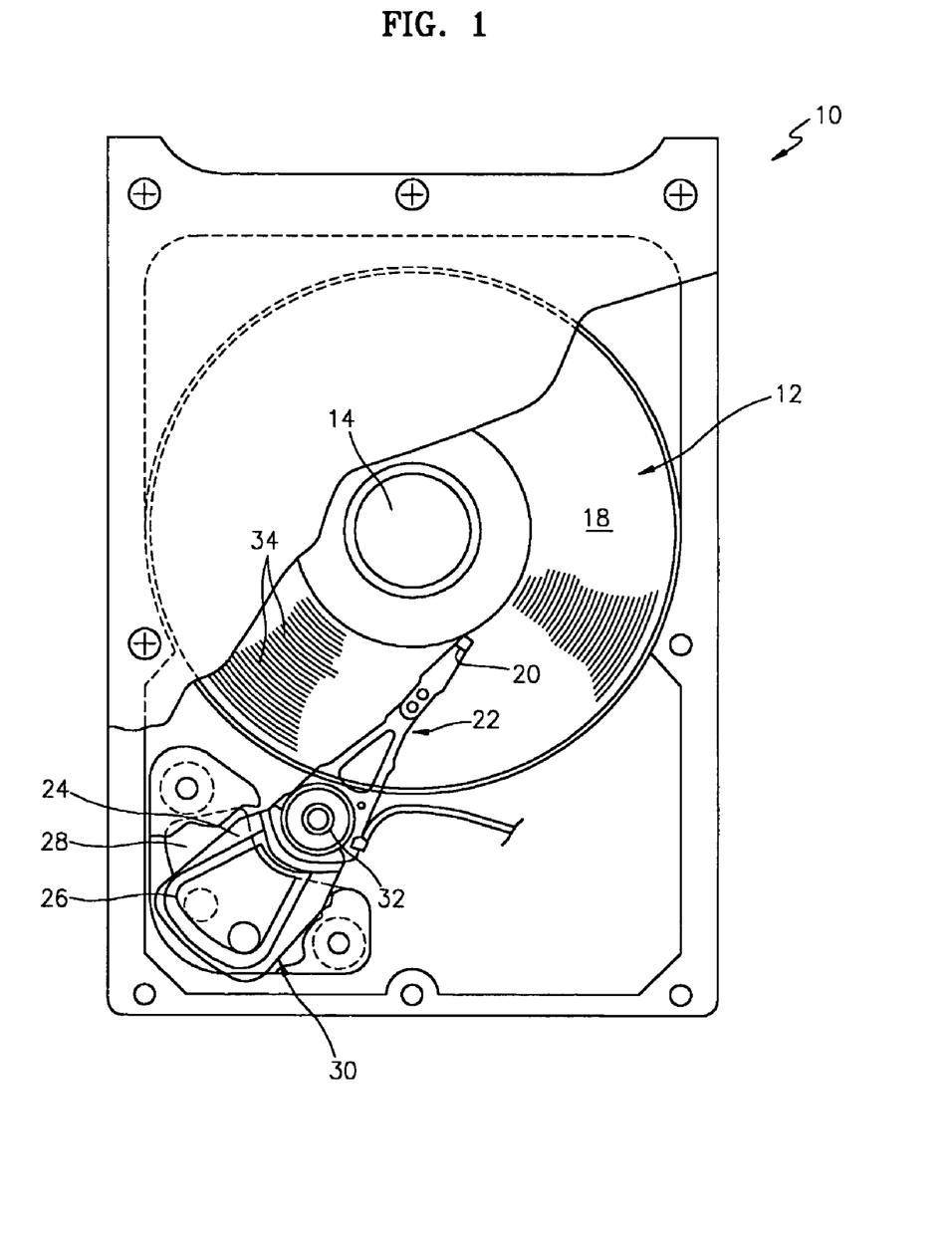
FIG. 1 is a plan view of a hard disc drive according to an aspect of the present invention.

FIG. 1 is a plan view of a hard disc drive 10 according to an embodiment of the present invention. Referring to FIG. 1, the drive 10 includes at least one magnetic disc 12 which is rotated by a spindle motor 14. The drive 10 also includes a converter (not shown) which is installed adjacent to a disc surface 18.

A transducer senses and magnetizes the magnetic field of the disc 12 so as to read or write information with respect to the disc 12. In general, the transducer is associated with the disc surface 18. For convenience, the transducer is presented as a single transducer. However, the transducer may be construed to comprise two transducers: a write transducer which magnetizes the disc 12; and a read transducer which senses the magnetic field of the disc 12. The read transducer is generally manufactured using a magneto-resistive (MR) device according to an aspect of the invention.

Also, the transducer may be included in a head 20. The head 20 is constructed to create an air bearing between the transducer and the disc surface 18. The head 20 is incorporated into a head stack assembly (HSA) 22. The HSA 22 is attached to an actuator arm 24 having a voice coil 26. The voice coil 26 is positioned adjacent to a magnetic assembly 28 that specifies a voice coil motor (VCM) 30. When a current is applied to the voice coil 26, a torque is generated to rotate the actuator arm 24 with respect to a bearing assembly 32. The rotation of the actuator arm 24 moves the transducer across the disc surface 18.

In general, information is stored in annular tracks 34 of the disc 12. Each track 34 comprises a plurality of sectors. Each sector comprises a data sector and a servo sector having a data field and an identification field. An inter sector gap (ISG) area is present between data sectors. Each identification field has a gray code for identifying a sector and a track (or cylinder). The transducer is moved across the disc surface 18 in order to read or write information to or from a desired track.

Figure 2:
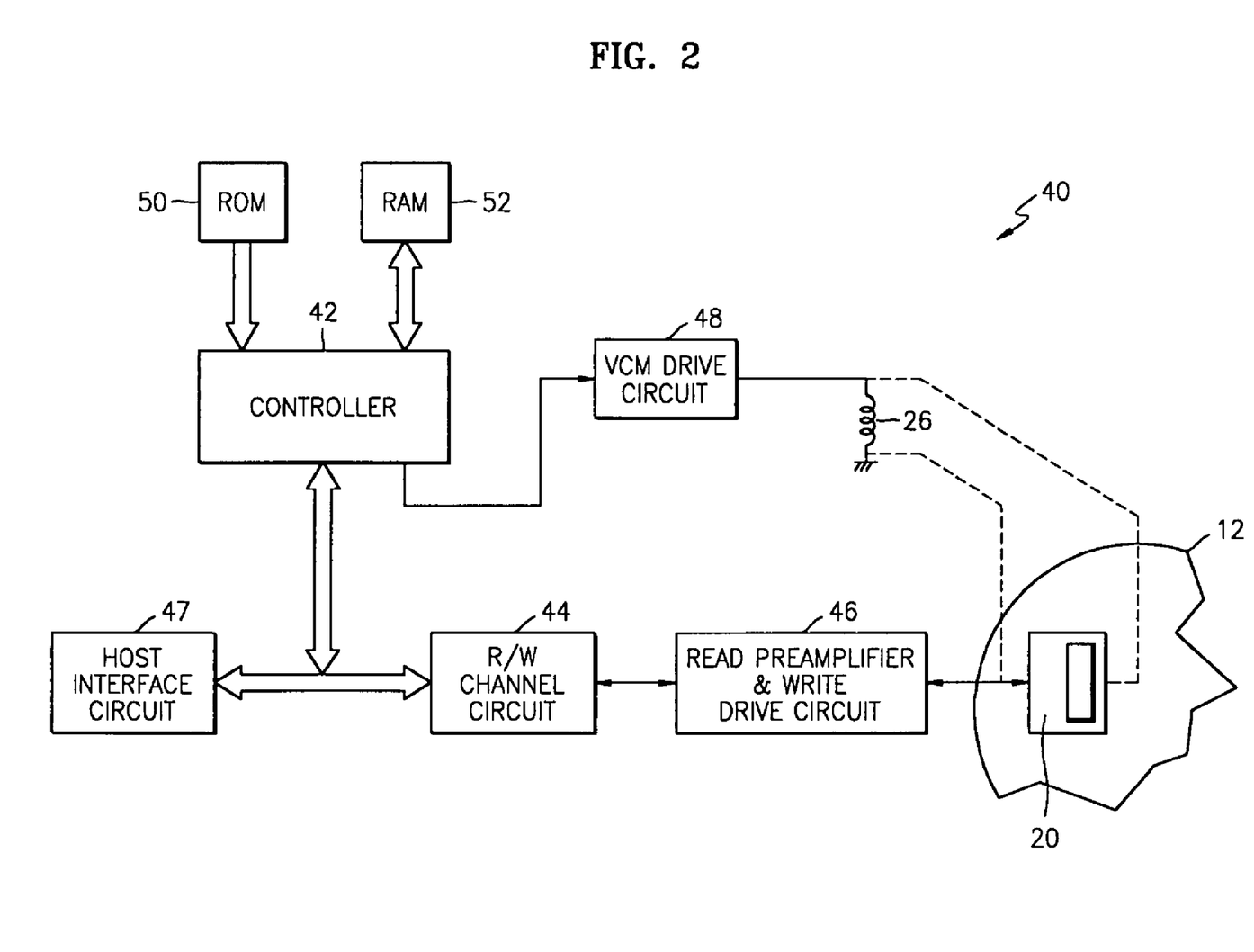
FIG. 2 is a circuit diagram of an electric system which controls a hard disc drive according to an aspect of the present invention.

FIG. 2 is a circuit diagram of an electrical system 40 that controls the hard disc drive 10 of FIG. 1, according to an aspect of the present invention. The electrical system 40 includes a controller 42 which is coupled to the head 20 using a read/write (R/W) channel circuit 44 and a read preamplifier & write drive circuit 46. The controller 42 may be a digital signal processor (DSP), a microprocessor, or a microcontroller controlled using software. However, the controller 42 could also be a circuit and/or mechanical in nature. The controller 42 provides a control signal to the R/W channel circuit 44 to read or write information with respect to the disc 12. The information is sent to the R/W channel circuit 44 and transmitted to a host interface circuit 47. In order to interface with a system such as a personal computer (PC), the host interface circuit 47 comprises a buffer memory device and a control circuit which allow operation of a disc drive.

In a read mode, the R/W channel circuit 44 converts an analog signal read by the head 20 and amplified by the read preamplifier & write drive circuit 46, into a digital signal so that a host computer (not shown) can read the signal. The R/W channel circuit 44 outputs the digital signal to the host interface circuit 47. Also, the R/W channel circuit 44 receives user data from the host interface circuit 47, converts the user data into a write current that can be recorded on the disc 12, and outputs the write current to the read preamplifier & write drive circuit 46.

The controller 42 is also coupled to a voice coil motor (VCM) drive circuit 48 which supplies a drive current to the voice coil 26. The controller 42 provides a control signal to the VCM drive circuit 48 in order to control the excitation of the VCM 30 and the movement of the transducer.

The controller 42 is also connected to a read-only memory (ROM) 50 (or a flash memory) or a random access memory (RAM) 52. The ROM 50 and the RAM 52 contain instructions and data which are used to execute a software routine by the controller 42 according to an aspect of the invention. It is understood that other types of memory could be used instead of or in addition to the ROM 50 and RAM 52.

A seek routine and a following routine are different types of software routines executed to control the transducer. The transducer is moved from one track to another track in the seek routine and the position of a target sector is detected in the following routine. The seek routine comprises a servo control routine which enables the transducer to be precisely moved to a desired track. The ROM 50 according to an embodiment of the present invention stores equations for calculating the acceleration, speed, and position to perform the seek routine and the following routine Also, the ROM 50 and the RAM 52 store programs which execute a method of adaptively performing a defect scan according to channel characteristics illustrated in FIG. 3 or 4, and a table wherein parameters are set to correspond to characterization values for evaluating the performance of a channel of a data storage system.

According to an embodiment of the present invention, bit per error rates (BER) are used as the characterization values. The parameters are set differently for each channel during the defect scan and may comprise a parameter for determining the length of an error correction code (ECC), a parameter for determining a write current, a parameter for determining a read bias current, and a parameter for determining filter characteristics that are used in signal processing.

Accordingly, the controller 42 controls read and write modes using a program and parameters stored in the ROM 50 and the RAM 52. The controller 42 measures predetermined characterization values related to the performance of respective channels and reads parameters, which correspond to the measured characterization values for each channel, from the table stored in the ROM 50 or the RAM 52. The controller 42 applies the parameters to a data processing procedure for each channel in order to run a defect scan.

Figure 3:
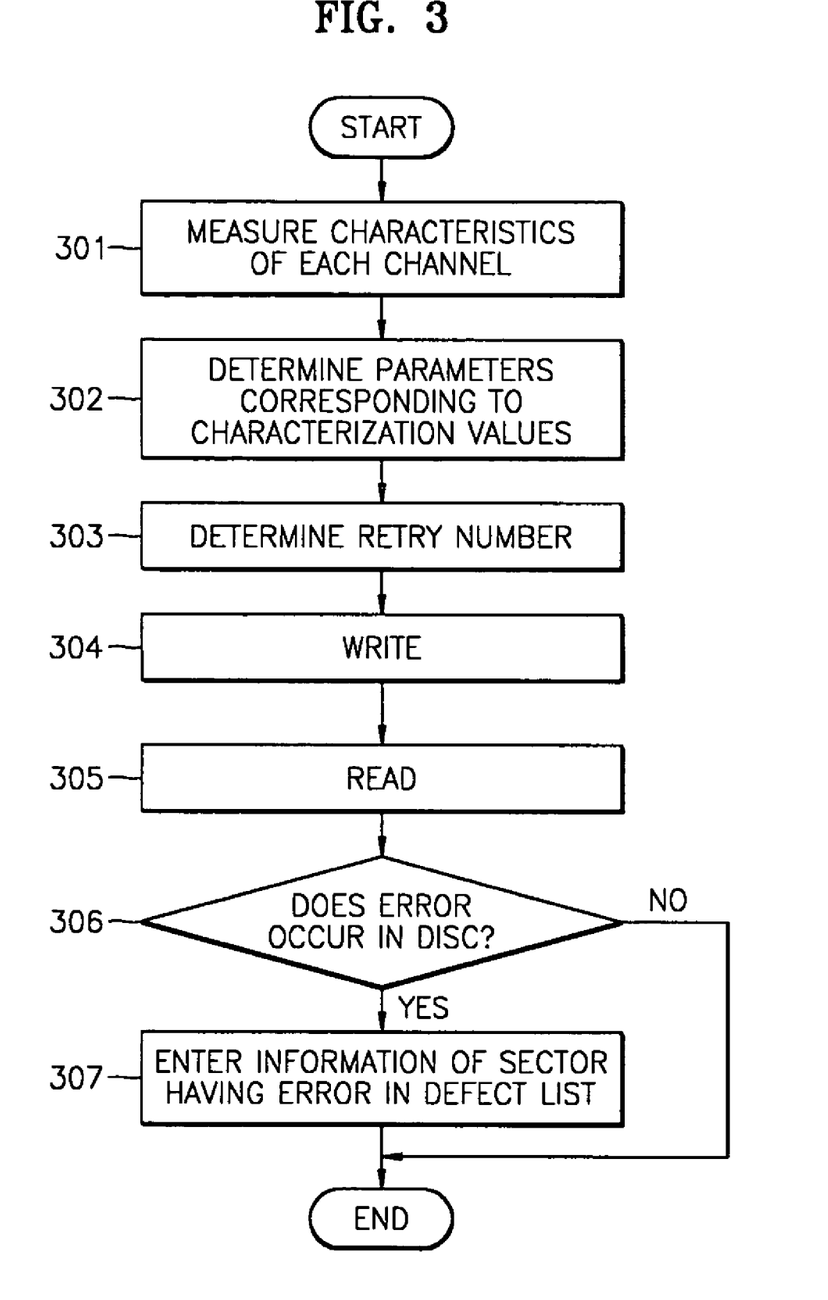
FIG. 3 is a flowchart illustrating a method of performing a defect scan according to channel characteristics, according to an aspect of the present invention.

A method of adaptively performing a defect scan to channel characteristics, according to an embodiment of the present invention is shown in FIG. 3. First, channel characteristics of a hard disc 12 are measured to obtain characterization values for each channel before performing a defect scan (operation 301). The channel characteristics may be detected by measuring the BER of the disc 12.

Then, parameters to match the characterization values are determined using a table stored in the ROM 50 and the RAM 52 (operation 302). The parameters may include a parameter for determining the length of an ECC, a parameter for determining a write current, a parameter for determining a read bias current, and a parameter for determining filter characteristics that are used in signal processing.

After determining the parameters to match the channel characteristics for each channel, the defect scan is run on the hard disc 12 according to the parameters. In the defect scan, first, a retry number for performing the defect scan is determined (operation 303). Then, test data is written to the respective channels of the disc 12 in order to determine the position of a defect of the disc for each channel (operation 304). Then the test data is read from each channel of the disc (operation 305). Errors in the test data are detected using a byte-length ECC which is determined using the parameter, the detected errors are corrected, and whether the errors occur because the ECC errors cannot be corrected is also determined, (operation 306). Whether a defect occurs in the disc 12 is determined after repeatedly performing the detection and correction of errors for a predetermined number of times.

If it is determined in operation 306 that the test data contains errors, the information of a sector in which the errors occur is entered on a defect list and an area of the disc 12 having the defect is slipped so that a user cannot use the area.

Figure 4:
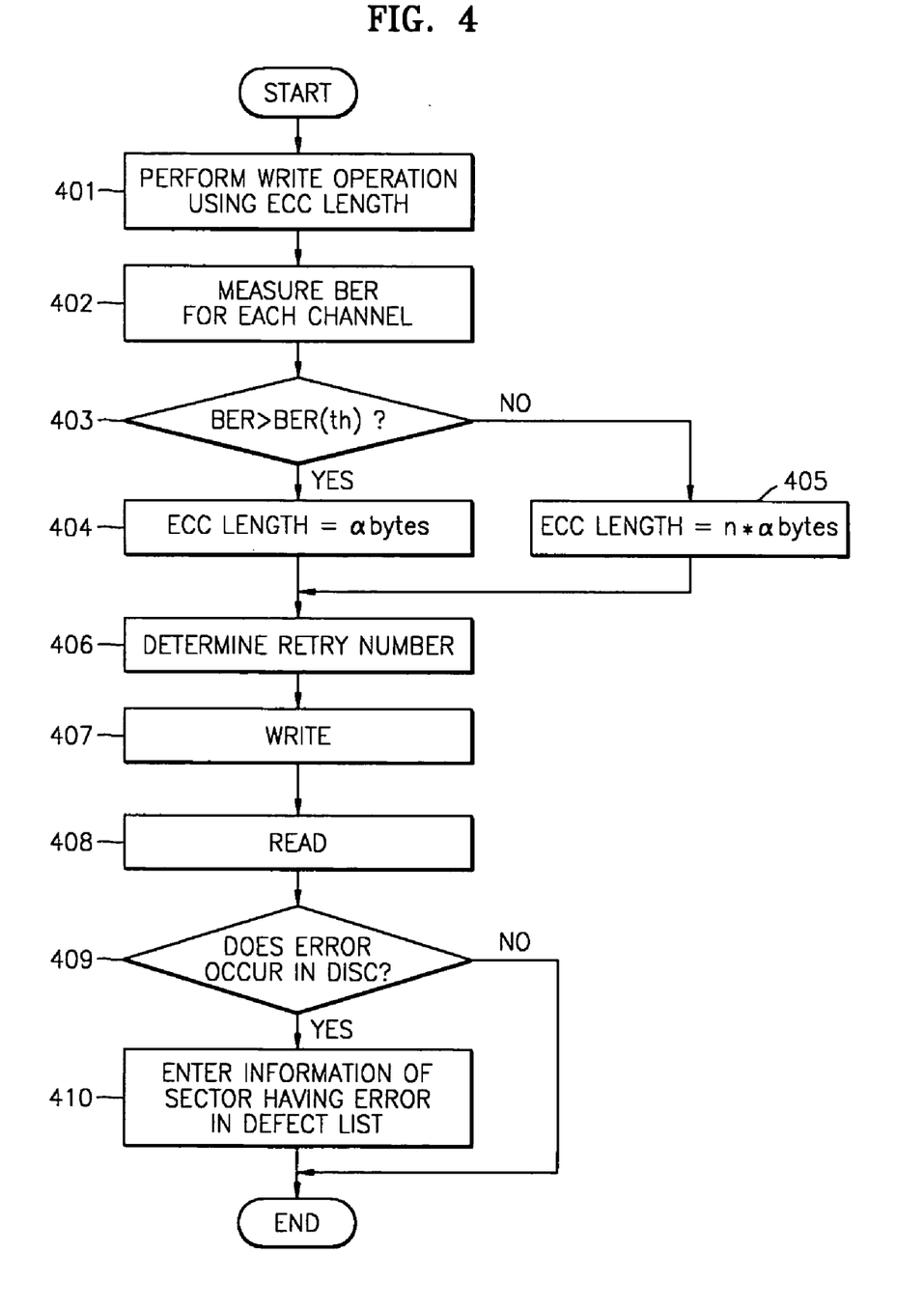
FIG. 4 is a flowchart illustrating a method of performing a defect scan according to channel characteristics, according to an embodiment of the present invention.

A method of adaptively running a defect scan according to channel characteristics, according to another embodiment of the present invention is shown in FIG. 4. The method uses the BER as characterization values for evaluating the performances of channels of a data storage system, and uses a parameter for determining the length of an ECC which changes according to characterization values for each channel.

In this method, test data is written to a particular area of each channel of a hard disc in a write mode using a reference ECC length (operation 401). Then, the test data is read from the particular area of each channel so as to measure BER values of the channels of the disc (operation 402). Then, each of the BER values, BER is compared with a reference BER value, BER(th) (operation 403). The BER(th) value may be a critical value that is experimentally determined by changing the length of an ECC in order to maintain the reliability of error detection. For example, the BER(th) value may be set to 6.5.

After operation 403, the lengths of the ECCs of channels in which the BER value is more than the BER(th) value, are determined to be α bytes (operation 404). For the other channels, the ECC lengths are determined to be n*α bytes (operation 405). Thus, α and n may be set to 1 and 2, respectively. That is, when a channel has the BER value, BER that is more than the reference BER value, BER(th), the ECC length of the channel is set to 1 byte and a 1-byte error correction is performed on the channel. Otherwise, the ECC length of the channel is set to 2 bytes and a 2-byte error correction is performed on the channel.

When the channel characteristics exceed the reference BER value, BER(th), the reliability of error detection is increased by reducing the ECC length. When the channel characteristics does not exceed the reference BER value, BER(th), the reliability of the error detection does not depend on the ECC length but the ECC length is increased to enhance the efficiency of a defect scan.

After determining the ECC length of each channel based on its BER in operation 405, the number of times for performing the defect scan is determined (operation 406).

After operation 406, test data is written to the respective channels in order to detect a sector, in which a defect occurs, for each channel (operation 407), and the test data is read from the respective channels of the disc 12 (operation 408). Then, the presence of errors in the test data for each channel is detected using the ECC length which is determined based on the channel characteristics, the detected errors are corrected, and whether the errors occur because ECC errors cannot be corrected is determined in operation 409). Whether a defect occurs in the disc 12 is determined by checking the presence of a sector having an error that cannot be corrected after repeatedly performing the detection and correction of errors in the test data for a predetermined number of times.

If it is determined in operation 409 that an error occurs in the disc 12, the information of a sector having the errors is placed on a defect list and an area of the disc having a defect is slipped so that a user cannot use the area.

As described above, it is possible to increase the reliability of error detection by measuring the characteristics of each channel and setting different design parameters for a defect scan according to the channel characteristics. In particular, channel characteristics according to an embodiment of the present invention are obtained using the BER of a hard disc, and the length of ECC of the disc is determined using design parameters that are changed based on the channel characteristics during a defect scan.

Figure 5:
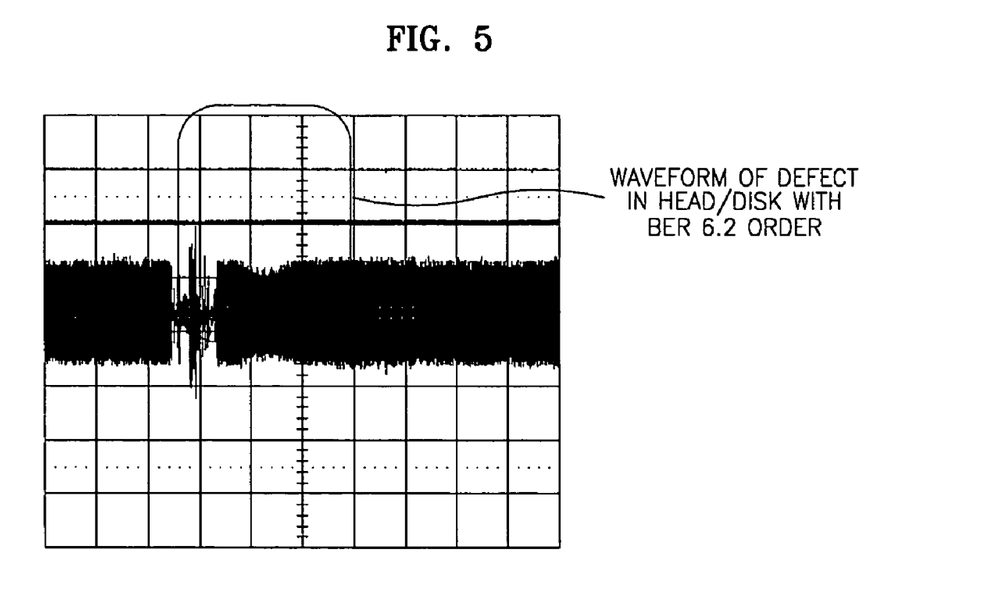
FIG. 5 illustrates a hard disc having a defect and a bit per error rate (BER) of 6.2.
Figure 6:
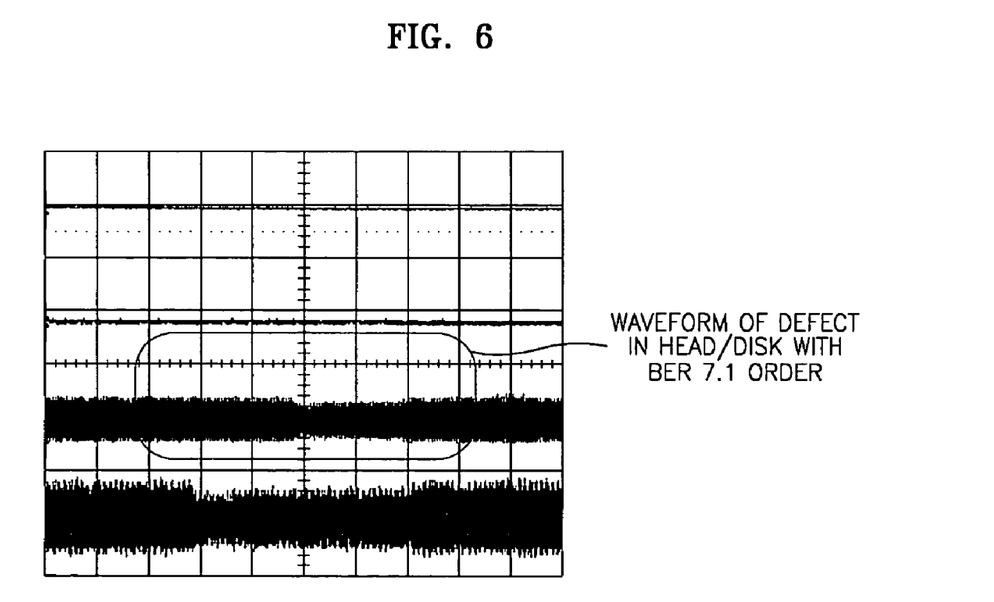
FIG. 6 illustrates a hard disc having a defect and a bit per error rate (BER) of 7.1.

In order to help understand the effects of the present invention, FIGS. 5 and 6 illustrate waveforms of defects occurring in channels of hard disc drives whose bit per error rates (BER) are 6.2 and 7.1, respectively.

As shown in FIG. 5, assuming that hard discs have channels with a BER of 6.2 and the lengths of their ECCs are 1 byte and 2 bytes, respectively, the following results of error detection are obtained when running a defect scan on the hard discs two times:

TABLE 1

|  | $1^{st}$ Test | $2^{nd}$ Test |
|---|---|---|
| 1-byte ECC | 100% | 100% |
| 2-byte ECC | 100% | 100% |

Referring to Table 1, although the BER is low (i.e., 6.2), it is possible to detect 100% of errors in both of the hard discs having the 1-byte and 2-byte ECCs.

In contrast, as shown in FIG. 6, if hard discs have channels with a BER of 7.1 and the lengths of their ECCs are 1 byte and 2 bytes, respectively, the following results of error detection are obtained when running a defect scan on the hard discs two times:

TABLE 2

|  | $1^{st}$ Test | $2^{nd}$ Test |
|---|---|---|
| 1-byte ECC | 97% | 99% |
| 2-byte ECC | 24% | 15% |

Referring to Table 2, if the BER is high (i.e., 7.1), and the ECC length is 2 bytes, 24% and 15% of errors in the hard discs are detected, and thus, the reliability of the defect scan is very low. However, if the BER is high (i.e., 7.1), and the ECC length is 1 byte, 97% and 99% of errors in the hard discs are detected.

Therefore, it is possible to more precisely detect errors in a hard disc by differently setting the length of ECC based on the BER of each channel of the disc, as shown in Tables 1 and 2.

As described above, according to an aspect of the present invention, the characteristics of the respective channels of a data storage system are determined, design parameters for each channel are appropriately and differently determined based on the channel characteristics, and then a defect scan is run on a hard disc using the determined parameters. Therefore, it is possible to minimize the occurrence of errors in the defect scan due to different channel characteristics, thereby rendering a more reliable defect scan.

The present invention may be embodied as a method, an apparatus, or a system. In a case where the present invention is accomplished by software, code segments for performing indispensable operations are required as constitutional elements. A program or code segments may be stored in a processor-readable medium or may be transmitted via a transmitting apparatus or network in response to a computer data signal that is combined with a carrier wave. Here, the processor-readable medium may be any medium capable of storing or transmitting data, e.g., an electronic circuit, a semiconductor memory device, a ROM, a flash memory, an erasable ROM (EROM), a floppy disk, an optical disc, a hard disc, an optical fiber medium, or a radio frequency (RF) net. Also, the computer data signal may be any signal that can be transmitted over a transmission medium such as an electronic net channel, an optical fiber, air, an electric field, or an RF net.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of performing a defect scan on a data storage system according to channel characteristics, the method comprising:
    measuring characterization values related to respective performances of channels of the data storage system;
    determining parameters for each of the channels respectively based on the measured characterization values, such that the parameters for each channel are different and being used for determining the data processing characteristics of the respective channel; and
    performing a defect scan on the data storage system using the determined parameters in a data processing procedure for each of the channels.

2. The method of claim 1, wherein the characterization values comprise bit per error rate values.

3. The method of claim 1, wherein the parameters comprise a parameter for determining the length of an error correction code for the corresponding channel.

4. The method of claim 1, wherein the parameters comprise a parameter for determining a write current value for the corresponding channel.

5. The method of claim 1, wherein the parameters comprise a parameter for determining a read bias current value for the corresponding channel.

6. The method of claim 1, wherein the parameters comprise a parameter for determining the characteristics of a filter that is used for signal processing for the corresponding channel.

7. The method of claim 1, wherein the parameters are set differently for each of the respective channels.

8. A method of performing a defect scan in a data storage system comprising:
    measuring a first channel characteristic to obtain a first characterization value for a first channel;
    measuring a second channel characteristic to obtain a second characterization value for a second channel;
    determining a first parameter to match the first characterization value and a second parameter to match the second characterization value using a table stored in a memory device which sets parameters corresponding to predetermined characterization values related to a performance of each of the first and second channels of the data storage system; and
    performing a defect scan for the first and second channels according to the corresponding determined first and second parameters, the first parameter being different from the second parameter.

9. The method of claim 8, wherein the first and second characterization values comprise bit per error rate values for the corresponding one of the first and second channels.

10. The method of claim 8, wherein each of the first and second parameters comprise a parameter for determining length of an error correction code for the corresponding one of the first and second channels.

11. The method of claim 8, wherein each of the first and second parameters comprise a parameter for determining a write current value for the corresponding one of the first and second channels.

12. The method of claim 8, wherein each of the first and second parameters comprise a parameter for determining a read bias current value for the corresponding one of the first and second channels.

13. The method of claim 8, wherein each of the first and second parameters comprise a parameter for determining characteristics of a filter that is used in signal processing for the corresponding one of the first and second channels.

14. The method of claim 8, wherein the performing of the defect scan comprises:
    determining a retry number for performing the defect scan;
    writing test data to each of the channels to determine the position of the defect;
    reading the test data from each of the channels;
    detecting errors in the test data using a byte-length error correction code;
    correcting the errors detected; and
    determining whether the errors occurred as a result of the error correction code errors not being corrected.

15. A method of performing a defect scan on a data storage system, the method comprising:
    determining a first parameter corresponding to a first channel and a second parameter different from the first parameter for a second channel; and
    applying the first parameter to the first channel and the second parameter to the second channel when performing a data processing procedure for the first and second channels during a performance of the defect scan.

* * * * *

UNITED STATES PATENT AND TRADEMARK OFFICE
CERTIFICATE OF CORRECTION

| | | |
|---|---|---|
| PATENT NO. | : 7,293,226 B2 | Page 1 of 1 |
| APPLICATION NO. | : 10/704704 | |
| DATED | : November 6, 2007 | |
| INVENTOR(S) | : Cheong-rae Ro et al. | |

It is certified that error appears in the above-identified patent and that said Letters Patent is hereby corrected as shown below:

Title Page, Column 1 (Inventors), Line 1, change "Choong rae Ro" to --Cheong-rae Ro--.

Signed and Sealed this

First Day of July, 2008

JON W. DUDAS
*Director of the United States Patent and Trademark Office*